United States Patent [19]

Sugiura

[11] Patent Number: 5,280,379
[45] Date of Patent: Jan. 18, 1994

[54] SCANNING OPTICAL APPARATUS

[75] Inventor: Yoshinori Sugiura, Kawasaki, Japan

[73] Assignee: Canon Kabushiki Kaisha, Tokyo, Japan

[21] Appl. No.: 698,343

[22] Filed: May 7, 1991

Related U.S. Application Data

[63] Continuation of Ser. No. 290,638, Dec. 27, 1988, abandoned.

[30] Foreign Application Priority Data

Dec. 28, 1987 [JP] Japan .................... 62-329663

[51] Int. Cl.⁵ .................... G02B 26/08; G01D 15/14
[52] U.S. Cl. .................... 359/217; 359/206; 346/160
[58] Field of Search ............ 350/6.1, 6.5, 6.6, 6.7, 350/6.8, 6.9, 6.91; 346/160, 108; 464/170

[56] References Cited

U.S. PATENT DOCUMENTS

| | | | |
|---|---|---|---|
| 3,826,578 | 7/1974 | King et al. | 350/6.8 |
| 4,003,059 | 1/1977 | Sugiura et al. | 346/108 |
| 4,246,612 | 1/1981 | Berry et al. | 350/6.8 |
| 4,623,216 | 11/1986 | Sato et al. | 350/68 |
| 4,629,283 | 12/1986 | Plaot | 350/6.8 |
| 4,704,698 | 11/1987 | Reiniger | 346/160 |
| 4,785,319 | 11/1988 | Fujino et al. | 346/160 |
| 4,800,401 | 11/1989 | Sato et al. | 306/108 |
| 4,834,520 | 5/1989 | Klainman | 350/6.8 |

Primary Examiner—Bruce Y. Arnold
Assistant Examiner—James Phan
Attorney, Agent, or Firm—Fitzpatrick, Cella, Harper & Scinto

[57] ABSTRACT

A scanning optical apparatus includes a deflecting member rotatable to deflect light from a light source, a lens unit for imaging the light on a member to be scanned, and a rotor for rotating the deflecting member, wherein a part of the lens unit is disposed above the rotor.

15 Claims, 4 Drawing Sheets

SCANNING OPTICAL APPARATUS

This application is a continuation of application Ser. No. 07/290,638 filed Dec. 27, 1988, now abandoned.

FIELD OF THE INVENTION AND RELATED ART

The present invention relates to a scanning optical system usable with a laser beam printer or the like, more particularly to arrangement and structure of an imaging lens system.

Referring first to FIG. 9, there is shown a conventional scanning optical apparatus of this type. The apparatus comprises a semiconductor laser source 20 for producing a laser beam which is reflected by a polygonal mirror 21 rotated by a driving motor 22. The reflected beam is imaged and scans on the photosensitive drum 24 which is a member to be scanned, through an f-θ lens group 23 constituting an imaging lens system. Since the polygonal mirror 21 has a large diameter of a circumscribed circle, since the number of reflecting surfaces is as large as approximately ten, and also since the f-θ lens group 23 has a long length of focus, the angle of deflection of the scanning beam is not so wide. In addition, because the distance between the polygonal mirror 21 and the f-θ lens group 23 is relatively long, the distance between the polygonal mirror 21 and the f-θ lens group 23 is long.

As disclosed in U.S. Pat. No. 4,623,216, in order to increase the moment of inertia for the purpose of stabilizing rotation of the polygonal mirror, there is provided a rotor having a diameter larger than the diameter of the circumscribed circle of the polygonal mirror. Further, by disposing the rotor between the polygonal mirror and a bearing therefor, oil, if it is used for the bearing, is prevented for scattering to the polygonal mirror. In addition, by making the outside diameter of the rotor larger than the diameter of the circumscribed circle of the polygonal mirror, windage loss is reduced.

Recently, the size of the laser beam printer is so reduced that a desk-top type is developed. In order to reduce the size, an f-θ lens group 23 having a short focus is required, and therefore, the distance between the f-θ lens group 23 and the polygonal mirror 21 is to be reduced. On the other hand, the reduction of the focal length of the f-θ lens group 23 results in interference with the f-θ lens group 23 and the rotor of the driving motor 22 which is made larger for the reasons described above. Therefore, the reduction of the apparatus is limited. Since the lenses constituting the f-θ lens group 23, and therefore, the imaging lens system, are mounted to the laser source and to a housing containing the polygonal mirror, it is required that they are correctly positioned relatively to the polygonal mirror and the laser source. When a plurality of lenses are used, each of the lenses has to be correctly positioned, which is cumbersome.

SUMMARY OF THE INVENTION

Accordingly, it is a principal object of the present invention to provide a scanning optical apparatus wherein a possible interference between an imaging lens system and a rotor of a driving motor for a beam deflecting member, and simultaneously, a distance between the imaging lens system and the deflecting member is minimized.

It is a further object of the present invention to provide a scanning optical apparatus wherein respective lenses constituting an imaging lens system are constructed as units, and therefore, they are easily mounted in a housing of the apparatus with high positional accuracy.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
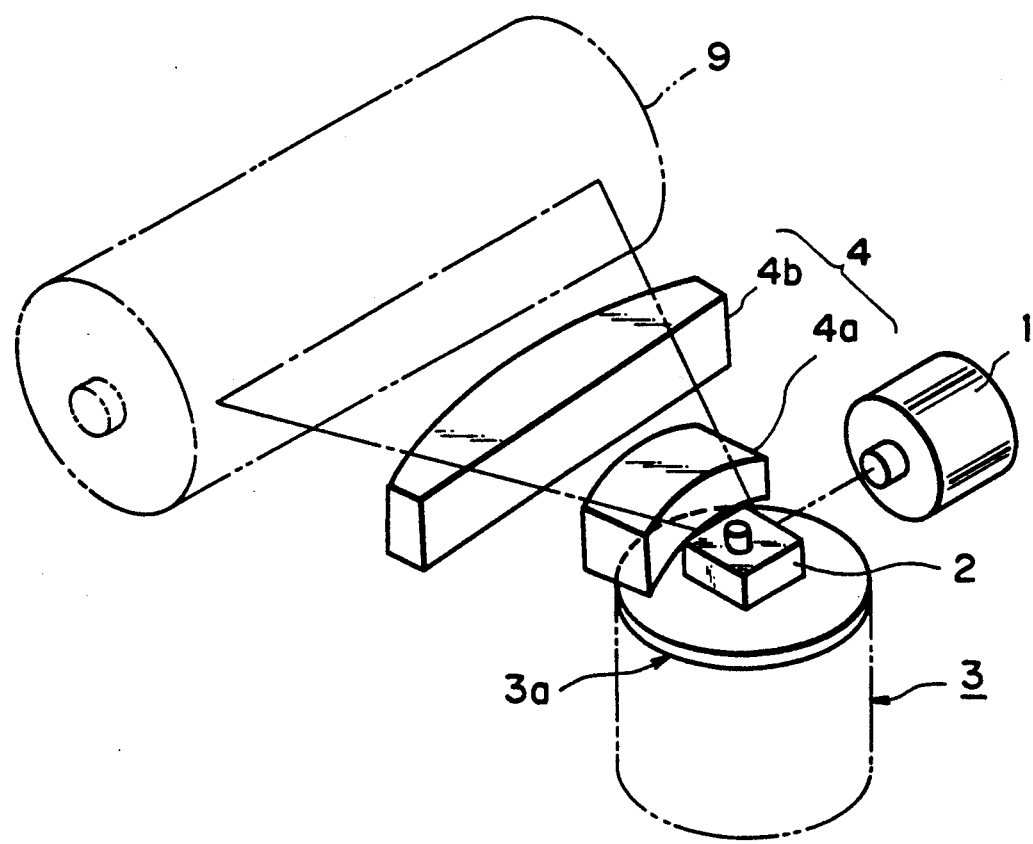
FIG. 1 is a perspective view of a laser beam printer using a scanning optical apparatus according to an embodiment of the present invention.

Referring to FIG. 1, there is shown a basic structure of a laser beam printer as an exemplary apparatus using a scanning optical apparatus according to an embodiment of the present invention. As shown in FIG. 1, there is provided a laser source 1. The laser beam emitted from the source 1 is deflected by a polygonal mirror 2 functioning as a beam deflecting member. The laser source 1 has an unshown laser chip and a collimator lens mounted as a unit. The polygonal mirror 2 is engaged with a rotor 3a of a driving motor and is rotated thereby. The beam deflected by the mirror surfaces of the polygonal mirror 2 scans a surface of the photosensitive drum 9 which is a member to be scanned. The diameter of a circumscribed circle of the polygonal mirror 2 is smaller than the diameter of the driving motor 3.

On the other hand, an f-θ lens group 4 functioning as an image lens system includes an entrance side lens 4a and an outgoing side lens 4b, and the entrance side lens 4a has a concave surface at the polygonal mirror 2 side, as if it encloses the polygonal mirror 2. Below the entrance side lens 4a, the rotor 3a of the driving motor 3 is disposed. The lens 4a is spaced from the polygonal mirror 2 with a predetermined gap and is spaced from the rotor 3a with a predetermined gap to avoid interference therewith.

Figure 2:
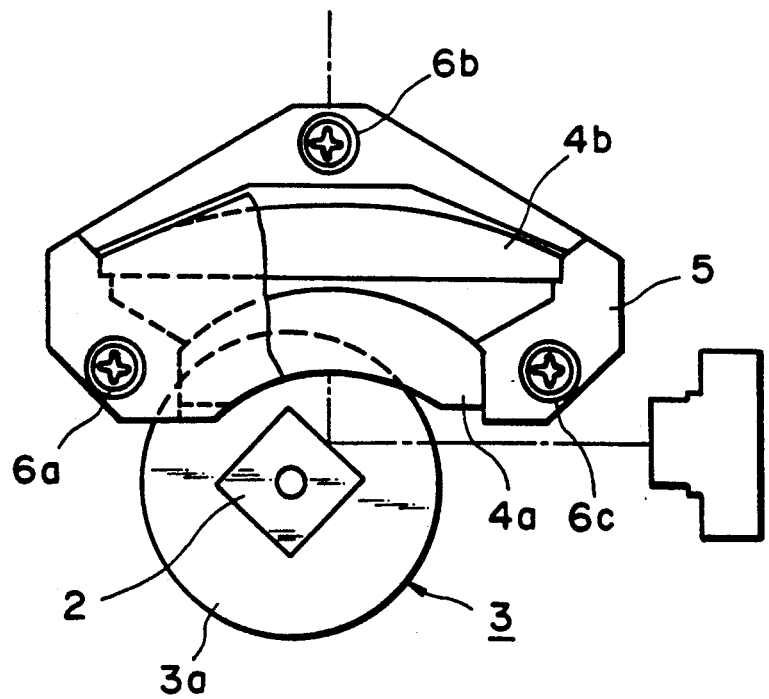
FIG. 2 is a top plan view illustrating mounting and supporting of an f-θ lens group relative to a laser source and to a deflecting member.

The f-θ lens group 4 in this embodiment is accommodated in a lens holder 5, as shown in FIG. 2. The number of the reflecting surface(s) of the polygonal mirror 2 and the entrance angle of the laser source 1 are not limited to those of this embodiment. The number of the reflecting surfaces of the polygonal mirror 2 is not more than five, and the entrance angle of the laser source 1 is approximately 90 degrees relative to the optical axis.

Figure 3:
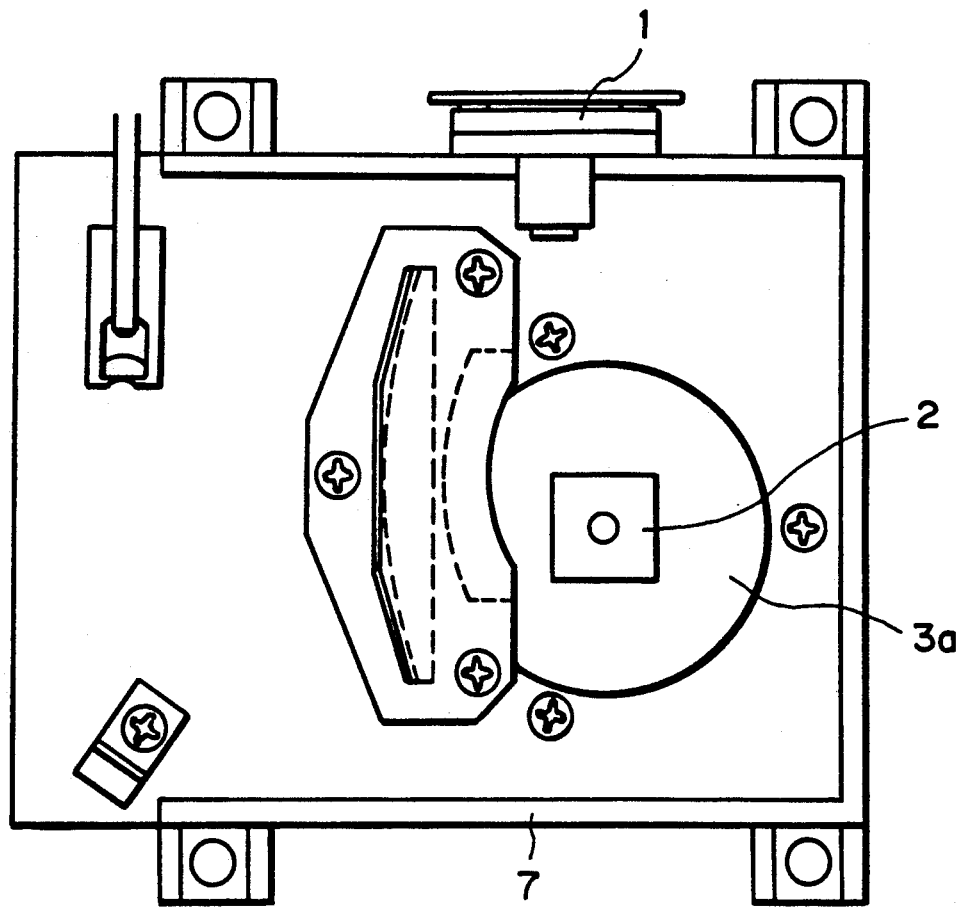
FIG. 3 is a top plan view of the apparatus of FIG. 2 in the housing.
Figure 4:
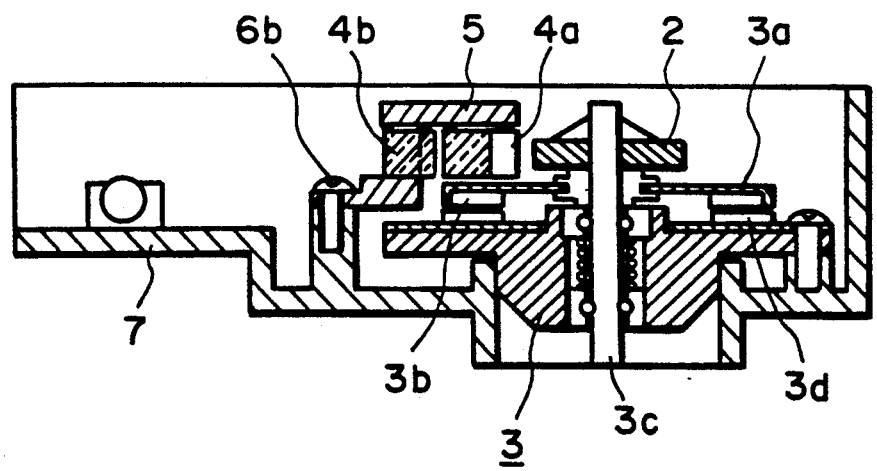
FIG. 4 is a sectional side view of the apparatus.
Figure 5:
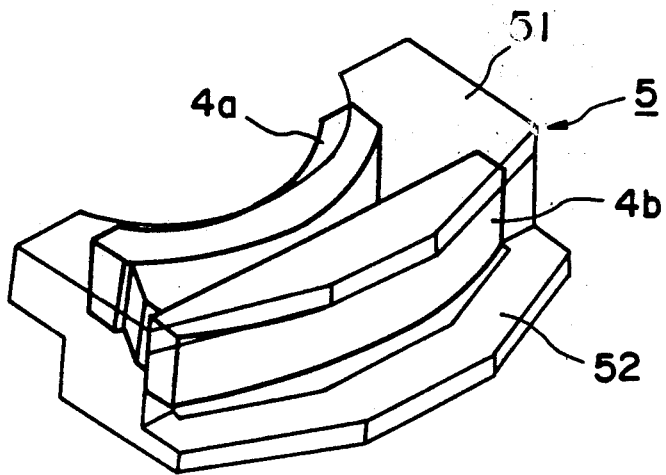
FIG. 5 is a perspective view of a lens holder used in the apparatus of FIG. 2.
Figure 6:
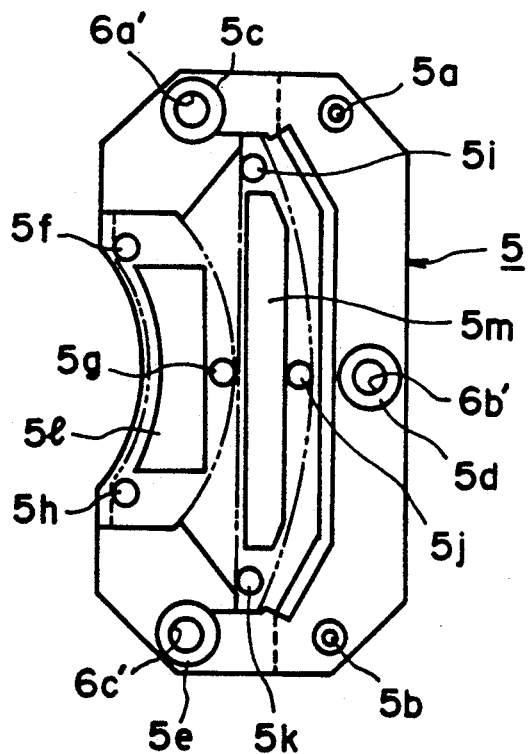
FIG. 6 is a bottom plan view of a lens holder of FIG. 5.
Figure 7:
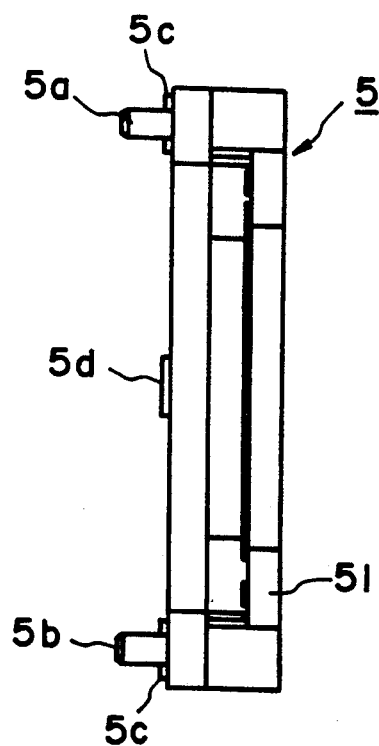
FIG. 7 is a side view of the lens holder of FIG. 5.
Figure 8:
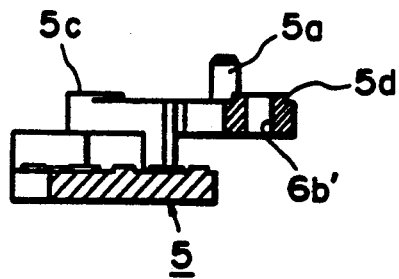
FIG. 8 is a front view of the lens holder of FIG. 5.
Figure 9:
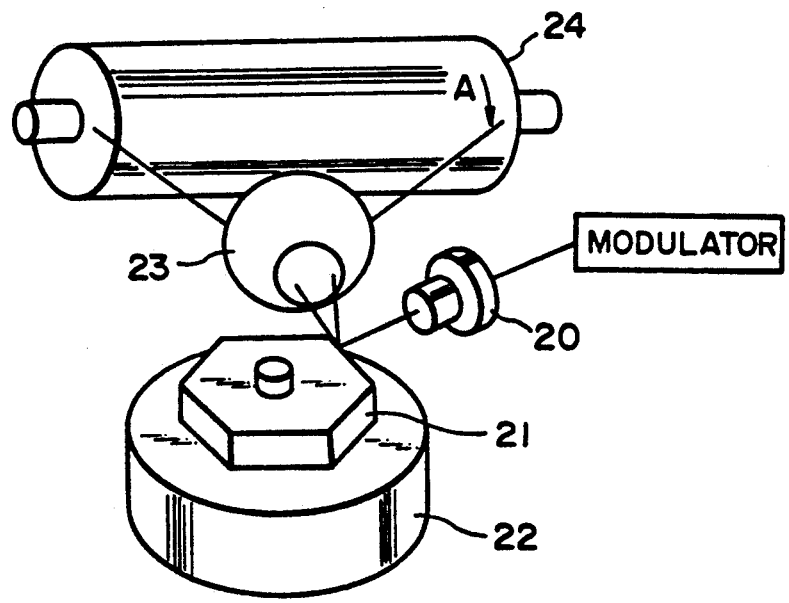
FIG. 9 is a perspective view of a conventional scanning optical apparatus.

Referring to FIGS. 3 and 4, a scanning system for scanning the photosensitive member in the laser beam printer of FIG. 1 is shown in detail. The scanning system includes a housing 7 and an unshown cover, and the housing 7 contains the polygonal mirror, the imaging lens system and a laser unit for emitting a laser beam modulated in accordance with an image to be formed shown in FIG. 2, so that they are protected from contamination with dust or the like and from deterioration of the optical accuracy.

As shown in FIG. 4, the entrance side lens 4a is disposed above the rotor 3a of the driving motor 3. The lens holder 5, particularly the lens 4a, is overlaid with a part of the rotor 3a, and the positions of the lens 4a and the polygonal mirror 2 are substantially on the same level. They are so mounted detachably in the housing 7 by screws 6a, 6b and 6c.

The rotor 3a of the driving motor 3 includes a magnet 3b which is opposed to a winding 3d in the direction parallel to an axis of a rotational shaft 3c. Referring to FIGS. 5–8, the lens holder 5 is shown. It comprises a top plate 51 and a bottom plate 52 which are deviated in the direction of the optical axis. The lens holder 5 is opened at its bottom side (near the rotor), and the top plate 51 is effective to connect the side walls. The holder 5 is integrally molded. By the holder 5, the lenses 4a and 4b are formed as a unit. The bottom surface of the bottom plate 52 of the lens holder 5 is provided with reference pins 5a and 5b projected therefrom for positioning itself relative to the housing 7 which functions as a main frame of the scanning optical apparatus. It is further provided with holds 6a', 6b' and 6c' for the screws 6a, 6b and 6c, and also with adjacent the periphery thereof reference seats 5c, 5d and 5e functioning as a reference for the mounting level. The top plate 51 is provided with reference seats 5f, 5g and 5h for positioning the entrance side lens 4a, and with reference seats 5i, 5j and 5k for positioning the outgoing side lens 4b, at three different positions, respectively. The top plate 51 is provided with a bonding seats 5l and 5m for bonding and fixing thereto each of the entrance and outgoing lenses 4a and 4b. The levels of the bonding seats 5l and 5m are slightly lower than the positioning reference seats 5f, 5g, 5h; 5i, 5j and 5k. In this manner, the lenses 4a and 4b are constructed as a unit by a lens holder 5, whereby the mounting accuracy between the lenses can be increased.

The inventor has dared to place a part of the lens unit above the rotor 3a, by which the distance between the lens 4a and the polygonal mirror is minimized, so that a compact scanning optical apparatus using a short focus lens can be accomplished.

According to this embodiment, the length of the optical path between the polygonal mirror 2 and the member to be scanned 9 can be shortened, and therefore, the positional accuracy therebetween is relatively easily obtained. In this aspect, the embodiment is particularly effective to a laser beam printer requiring a high optical accuracy.

The imaging lens has f-θ characteristics to provide a constant linear scanning speed on the photosensitive member by the laser beam when the polygonal mirror 2 is rotated to scan the photosensitive member with the laser beam. The f-θ characteristics are more easily obtained if the focal length of the lens is shorter. Therefore, the present invention is particularly effective from this aspect since the lenses 4a and 4b are placed above the rotor 3a with the use of the short focal length lenses as in this embodiment. Since the centers of the lens 4a and the polygonal mirror 2 in the direction of the thicknesses thereof are on the same plane, so that even if the levels of the lens system and the polygonal mirror are slightly deviated, the laser beam is incident substantially at the center of the lens 4a, and therefore, the beam is not influenced by the aberration.

Since the outside diameter of the rotor 3a is larger than the diameter of a circumscribed circle of the polygonal mirror 2, proper moment of inertia effective to reduce the non-uniform rotational speed can be maintained, and in addition, the windage loss is reduced by the rotor, and furthermore, the air resistance to the corners of the polygonal mirror 2 is reduced, thus reducing deposition of dust to the corner. The rotor 3a is provided with a magnet 3b which in turn is provided with a coil 3d opposed thereto in the direction parallel to the rotational axis 3c, whereby the height of the rotor 3a can be reduced, and therefore, the entire height of the apparatus can be reduced.

The lens 4a is spaced from the polygonal mirror 2 and from the rotor 3a with predetermined gaps, and therefore, the mounting positions are slightly deviated from the respective design position, or even if the rotor 3a vibrates, they are not interfered one another, so that proper operation can be maintained.

The f-θ lens group 4 is bonded and fixed to the top plate 51 of the lens holder 5, and the opposite surface is not supported by any member or is supported by a small supporting member, and therefore, the distance between the rotor 3a and the entrance side lens 4a can be minimized to such an extent that the rotor 3a is very close to the bonded portion. For this reason, the entire height of the apparatus can be reduced, thus reducing the entire size of the apparatus.

When the bearing is such a type using oil, it is possible that oil mist is scattered from the bearing during high speed rotation and is deposited on the reflecting surfaces of the polygonal mirror to reduce the reflective index. In order to avoid this, the rotor is utilized for blocking the oil mist to prevent the reduction of the reflective index, the rotor 3a may be disposed between the polygonal mirror 2 and the bearing. In this case, if the polygonal mirror 2 is remote from the rotor 3a, the whirling of the polygonal mirror attributable to bending of the rotor shaft or the like is increased. However, according to the embodiment of the present invention, the distance between the rotor 3a and the polygonal mirror 2 can be reduced sufficiently, whereby the whirling of the polygonal mirror 2 attributable to the bending of the rotor shaft or to the play in the bearing can be minimized.

When the driving motor uses a bearing with oil, the oil leaked out of the motor below the rotor 3a scatters by the rotation of the rotor 3a in the tangential direction of the circumference of the rotor, and therefore, it is not deposited on the lenses 4a and 4b above the rotor, thus protecting the lens 4a and 4b from contamination.

The lens holder 5 has reference seats 5f, 5g, 5f; 5i, 5j, 5k for supporting lenses 4a and 4b, by which the positional accuracy of the mountings of the lenses 4a and 4b is improved.

Since three reference seats 5f, 5g, 5h; 5i, 5j, 5k for one lens, so that each of the lenses is abutted to the three reference seats, thus further increasing the mounting accuracy. The lens holder 5 is provided with bonding seats 5l and 5m for bonding and fixing the lenses 4a and 4b below the reference seats, fixed without interference with the reference seats. Therefore, the mounting accuracy is not degraded.

The lenses 4a and 4b are mounted to the housing 7, and they are constructed as a unit, whereby the mounting accuracy between the lenses can be enhanced. As for the mounting to the housing 7, it will suffice if only one element, that is, the lens holder 5 is mounted with high positional precision. Therefore, even if a high accuracy is required, the mounting operation is simplified.

Since the lens holder 5 is detachably mountable to the housing 7, maintenance operations are easy.

Since the top plate 51 and the bottom plate 52 of the lens holder 5 are deviated in the direction of the optical axis, so that the bottom side of the top plate 51 can be opened, by which the lens 4a and rotor 3a can be closely positioned. Therefore, the lens 4a can be mounted in opposition to the polygonal mirror 2 with high accuracy, so that the light deflected by the polygonal mirror 2 can be correctly passed through the lens 4a, and the optical path length can be shortened. In this manner, the size of the apparatus can be decreased.

While the invention has been described with reference to the structures disclosed herein, it is not confined to the details set forth and this application is intended to cover such modifications or changes as may come within the purposes of the improvements or the scope of the following claims.

What is claimed is:

1. A scanning optical apparatus comprising:
   a deflecting member rotatable to deflect light from a light source;
   a rotor for rotating said deflecting member, said rotor having a rotational axis common with that of said deflecting member and having a maximum radius larger than that of said deflecting member; and
   a lens for imaging the light deflected by said deflecting member on a member to be scanned, said lens having a support surface not facing said rotor;
   wherein said lens is disposed within the maximum radius of the rotor, whereby said lens overlaps said rotor in the direction of the common axis.

2. An apparatus according to claim 1, wherein said scanning optical apparatus is used with a laser beam printer wherein the light is modulated in accordance with information and scans a photosensitive member.

3. An apparatus according to claim 1, wherein said deflecting member includes a rotational reflecting mirror rotatable in one direction, and said lens has an f-θ characteristics.

4. An apparatus according to claim 1, wherein said lens and said deflecting member are substantially on the same plane.

5. An apparatus according to claim 4, wherein centers of thicknesses of said lens and said deflecting member are substantially on the same plane.

6. An apparatus according to claim 1, wherein said rotor is provided with a magnet which is faced to a coil in a direction parallel to the rotational axis of said rotor.

7. An apparatus according to claim 1, wherein said lens is directly adjacent the maximum radius of said deflecting member.

8. An apparatus according to claim 1, wherein said lens does not overlap said deflecting member in the direction of the common axis.

9. An apparatus according to claim 1, wherein said lens is above said rotor.

10. An apparatus according to claim 1, wherein said support surface is opposite from a surface of said lens which faces said rotor.

11. An apparatus according to claim 10, wherein said support surface is a top surface of said lens.

12. An apparatus according to claim 1, wherein said support surface is adapted to be supported by at least one reference surface for positioning said lens.

13. An apparatus according to claim 12, wherein said support surface is adapted to be supported by three reference surfaces.

14. An apparatus according to claim 12, wherein said support surface is adapted to be bonded by a bonding surface at a level lower than said reference surface.

15. An image recording apparatus, comprising:
   a light source;
   a photosensitive member;
   a deflecting member rotatable to deflect light from said light source;
   a rotor for rotating said deflecting member, said rotor having a rotational axis common with that of said deflecting member and having a maximum radius larger than that of said deflecting member; and
   a lens for imaging the light deflected by said deflecting member on said photosensitive member, said lens having a support surface not facing said rotor;
   wherein said lens is disposed within the maximum radius of said rotor, whereby said lens overlaps said rotor in the direction of the common axis.

* * * * *